United States Patent
Derheim

(10) Patent No.: US 9,821,377 B2
(45) Date of Patent: Nov. 21, 2017

(54) CHUCK AND CLAMP WITH QUICK CHANGE FUNCTION

(71) Applicant: Roehm GmbH, Sontheim/Brenz (DE)

(72) Inventor: Waldemar Derheim, Villingen-Schwenningen (DE)

(73) Assignee: Roehm GmbH, Sontheim/Brenz (DE)

( * ) Notice: Subject to any disclaimer, the term of this patent is extended or adjusted under 35 U.S.C. 154(b) by 146 days.

(21) Appl. No.: 14/794,276

(22) Filed: Jul. 8, 2015

(65) Prior Publication Data
US 2016/0008894 A1    Jan. 14, 2016

(30) Foreign Application Priority Data

Jul. 8, 2014 (DE) .................. 10 2014 109 546

(51) Int. Cl.
*B23B 31/39* (2006.01)
*B23B 31/20* (2006.01)
(Continued)

(52) U.S. Cl.
CPC ............ *B23B 31/39* (2013.01); *B23B 31/207* (2013.01); *B23B 31/26* (2013.01);
(Continued)

(58) Field of Classification Search
CPC ......... B23B 31/39; B23B 31/26; B23B 31/42; B23B 31/113; B23B 2231/2078; B23B 2240/04; B23B 31/4033; B23B 31/4026; B23B 31/406; B23B 31/4066; Y10S 279/901; Y10T 279/1045; Y10T 279/1041; Y10T 279/1037; Y10T 279/17888; Y10T 279/17863
See application file for complete search history.

(56) References Cited

U.S. PATENT DOCUMENTS 1,886,177 A * 11/1932 Gairing ................. B23B 31/113
279/76
1,975,877 A * 10/1934 Thomas ................ B23B 31/113
279/9.1
(Continued)

FOREIGN PATENT DOCUMENTS

DE    3130447 A1 * 2/1983 ........... B23B 31/113
DE    4214838 A1 * 11/1993 ........... B23B 31/207

*Primary Examiner* — Eric A Gates
*Assistant Examiner* — Chwen-Wei Su
(74) *Attorney, Agent, or Firm* — Muncy, Geissler, Olds & Lowe, P.C.

(57) ABSTRACT

A chuck with a chuck body having a guide opening and an actuating element, and with at least one interchangeable clamp that can be inserted into the guide opening. The clamp has associated therewith a rotary disk with a blocking element that secures the rotary disk against rotation relative to the chuck body during insertion of the clamp into the guide opening. This makes it possible that, upon a rotation of the clamp about the longitudinal axis in the guide opening, a segment can be displaced outward toward the chuck body by the rotation relative to the rotary disk, via which the clamp is detachably secured on the chuck body. A clamp with a clamp body, a pivot body located in the clamp body, and a chucking element is also provided. The clamp has, at the opposite end of the clamping element, a locking unit that carries the pivot body.

7 Claims, 8 Drawing Sheets

(51) Int. Cl.
  *B23B 31/26* (2006.01)
  *B23B 31/40* (2006.01)
  *B23B 31/113* (2006.01)
  *B23B 31/42* (2006.01)

(52) U.S. Cl.
  CPC ......... *B23B 31/4033* (2013.01); *B23B 31/113* (2013.01); *B23B 31/42* (2013.01); *B23B 2231/2078* (2013.01); *B23B 2240/04* (2013.01); *Y10T 279/17863* (2015.01); *Y10T 279/17888* (2015.01)

(56) References Cited

U.S. PATENT DOCUMENTS

| | | | | |
|---|---|---|---|---|
| 2,057,143 | A | * | 10/1936 | Gairing ................. B23B 31/113 279/93 |
| 4,688,810 | A | | 8/1987 | Waite |
| 5,160,150 | A | * | 11/1992 | Schmidt ................. B23B 31/202 279/46.7 |
| 6,149,357 | A | | 11/2000 | Skellon |
| 2011/0233839 | A1 | * | 9/2011 | Haimer ................. B23B 31/113 269/57 |
| 2015/0021864 | A1 | * | 1/2015 | Mauch ................. B23B 31/201 279/43.1 |

* cited by examiner

CHUCK AND CLAMP WITH QUICK CHANGE FUNCTION

This nonprovisional application claims priority under 35 U.S.C. §119(a) to German Patent Application No. 10 2014 109 546.4, which was filed in Germany on Jul. 8, 2014, and which is herein incorporated by reference.

BACKGROUND OF THE INVENTION

Field of the Invention

The present invention relates to a chuck with a chuck body having a guide opening and an actuating element, and with at least one interchangeable clamp that can be inserted into the guide opening. In addition, the invention relates to a clamp with a clamp body, a pivot body located in the clamp body, and a chucking element.

Description of the Background Art

Chucks are known in practice, and are offered by the applicant under the designation KZZT. A Clamp, which can be a mandrel, is also known in practice, and are offered by the applicant under the designation ABSIS. In order to change the clamp, it is normally necessary to release the tension linkage from the drawbar using a special wrench. The other clamp must then be placed on the tension linkage, positioned until the mounting holes fit, and then fastened by screws. An alternative installation by a bayonet connection between the drawbar and the clamp is also possible. In this case, the clamp is rotated by an opening angle of the bayonet when set in place, and is rotated to the mounting holes and fastened. Both methods are resource-intensive due to the complicated alignment of the clamp to the chuck prior to installation, and also due to the necessity to use special tools. Moreover, a change in the type of clamp, e.g., changing from a clamping jaw to a mandrel, means that it is necessary to change not only the actual clamp but also the chuck, which means that two components must be changed when changing the clamp.

SUMMARY OF THE INVENTION

It is therefore an object of the present invention to provide a chuck with which rapid changing of a clamp is made possible. At the same time, the chuck should be implemented such that even different clamps with different locking systems can be installed easily and rapidly. Moreover, the invention provides a clamp with a locking system that can be installed on a chuck especially rapidly.

This object is attained according to an exemplary embodiment of the invention with a chuck in that a clamp has associated therewith a rotary disk with a blocking element that secures the rotary disk against rotation relative to the chuck body during insertion of the clamp into the guide opening, and in that upon a rotation of the clamp about the longitudinal axis in the guide opening, a segment can be displaced outward toward the chuck body via the rotation relative to the rotary disk for detachable securing of the clamp on the chuck body.

The invention considerably simplifies and accelerates the changing of the clamp in a chuck, since the blocking element determines the location and orientation of the clamp relative to the chuck upon insertion in the guide opening. At the same time, the clamp is not only secured by rotation as in a conventional bayonet mount, but instead is additionally wedged toward the outside in the chuck body by a segment. No special tools are required for changing, and at the same time the construction of the chuck makes it possible to accommodate different locking systems of different clamps.

Moreover, provision is made within the scope of the invention that the chuck body can have a radially formed blocking element receptacle for the blocking element projecting laterally from the rotary disk. This achieves simple alignment of the clamp to the chuck upon insertion in the guide opening. In this design it is possible to form a blocking element receptacle that is open toward the top, instead of merely a detent seat with a recess for the blocking element, in order to permit easy insertion of the blocking element in lateral limiting webs. Alternatively, a detent seat with a spring would also be a possible embodiment. It has proven beneficial to implement the blocking element in the form of a pin or a peg. Implementation as a ball would also be possible.

Furthermore, the segment and the rotary disk can have a bearing element coupling them, for the clamp to have a cover with a guide slot, and for the segment to have a guide that is displaced in the guide slot during a rotary motion of the clamp. Once the clamp has been inserted into the guide opening, the clamp can be moved about its longitudinal axis, wherein the rotational position of the rotary disk relative to the chuck body is defined by the blocking element. The coupling of the segment and the rotary disk by the bearing element permits relative motion of the segment and rotary disk during rotation of the clamp. In this process, the motion of the guide in the guide slot during rotation of the clamp moves the segment outward to interact with the chuck body, with the axis of rotation of the segment being defined by the bearing element. It has proven to be advantageous to implement the bearing element in the form of a peg or a pin.

The segment can be implemented as a latch in the form of a segment of a reference circle. In this design, the latches serve as a connection between the actuating element of the chuck and the clamp. Alternatively or in addition, the latches serve to secure the clamp in the chuck in that outward pressure is exerted on the actuating element to produce frictional locking.

A groove that serves to receive the outward-movable segment can be formed in the actuating element. In this design, the groove ensures that when the actuating element in the chuck is actuated, the actuating mechanism in the clamp is carried along via contact of the contact surfaces, thus clamping the clamp. Alternatively and in addition, the advantage of a groove in which the segment can be accommodated resides in an additional reinforcement of the securing of the segment, and thereby the clamp, through positive locking.

The segment can be provided in multiple instances that are uniformly distributed over the circumference and are provided with a corresponding number of guides and bearing elements. In this design, the cover has a number of guide slots equivalent to the guides and the actuating element has a corresponding number of grooves, or one groove extending radially over the inner circumference of the actuating element. The segment can be three annular latches distributed over the circumference, with the relevant ends being adapted to one another so that a space-saving arrangement is possible. In an embodiment the latches are rounded at one end and have a latch receptacle at the other end that is rounded in a manner matched thereto. To move the latches outward by rotation, each latch should have a corresponding number of guides, and the cover should have a corresponding number of guide slots. One guide, one bearing element, and one guide slot per latch have proven to be advantageous in this design. Furthermore, the number of grooves should be matched to the number of latches, wherein it has proven to be advantageous for manufacture for the grooves to be combined into one annular groove extending along the inner circumference of the actuating element. Two detent elements on opposite sides represent an alternative to the latches distributed in the shape of a ring over the circumference. It would be possible to move these outward not by the guides that are moved within a guide slot, but instead by a rotatably supported 3-dimensional shape located in the same plane as the latches, for example a cuboid or prism, the sides of which push the detent elements outward through rotation. Alternatively, spring-supported detent elements that move outward after insertion into the chuck would also be possible.

With regard to the simplicity of aligning the clamp during insertion into the chuck, it is beneficial that the chuck body has a securing mechanism and that a clamp body of the clamp has a guide slot that permits translational and rotational motion of the securing mechanism of the block. The advantage here resides in a simplification of the alignment of the clamp. For example, a screw, pin, peg, hex bolt, etc. represent exemplary embodiments of the securing mechanism. Furthermore, it has also proven to be advantageous for the implementation of the guide slot when the part of the guide slot that permits the translational part of the motion extends axially parallel to the clamp and the guide slot then has a right angle for the rotational motion.

In addition, with the aid of the securing mechanism, even a clamp with a different locking system, which is to say without rotational motion and without wedging latches, can be secured in the same chuck. To this end, the alternative clamp is pushed into the guide opening of the chuck. In place of a guide slot with translation and rotation regions, the clamp has a clamp recess extending axially parallel to the longitudinal axis of the clamp, into which the securing mechanism of the chuck can project. Securing is then accomplished by pulling on a drawbar, which moves an actuating element that stands in connection with the clamp.

The clamp can have an elastic thrust piece in a thrust piece receptacle that slides into a recess of the rotary disk during rotation of the clamp relative to the rotary disk and serves to align the rotary disk and the blocking element relative to the chuck, thus simplifying preassembly.

Moreover, the object regarding the clamp is attained according to the invention with a clamp of the initially mentioned type in that that a locking unit that carries the pivot body is located at an opposite end of the clamping element, and in that the locking unit comprises an arrangement formed of a rotary disk with which a blocking element is associated, at least one outward-movable segment, and a cover.

The cover can be connected to the pivot body via a connecting member for aligning the cover and thus serves to align the guide slots.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 9:
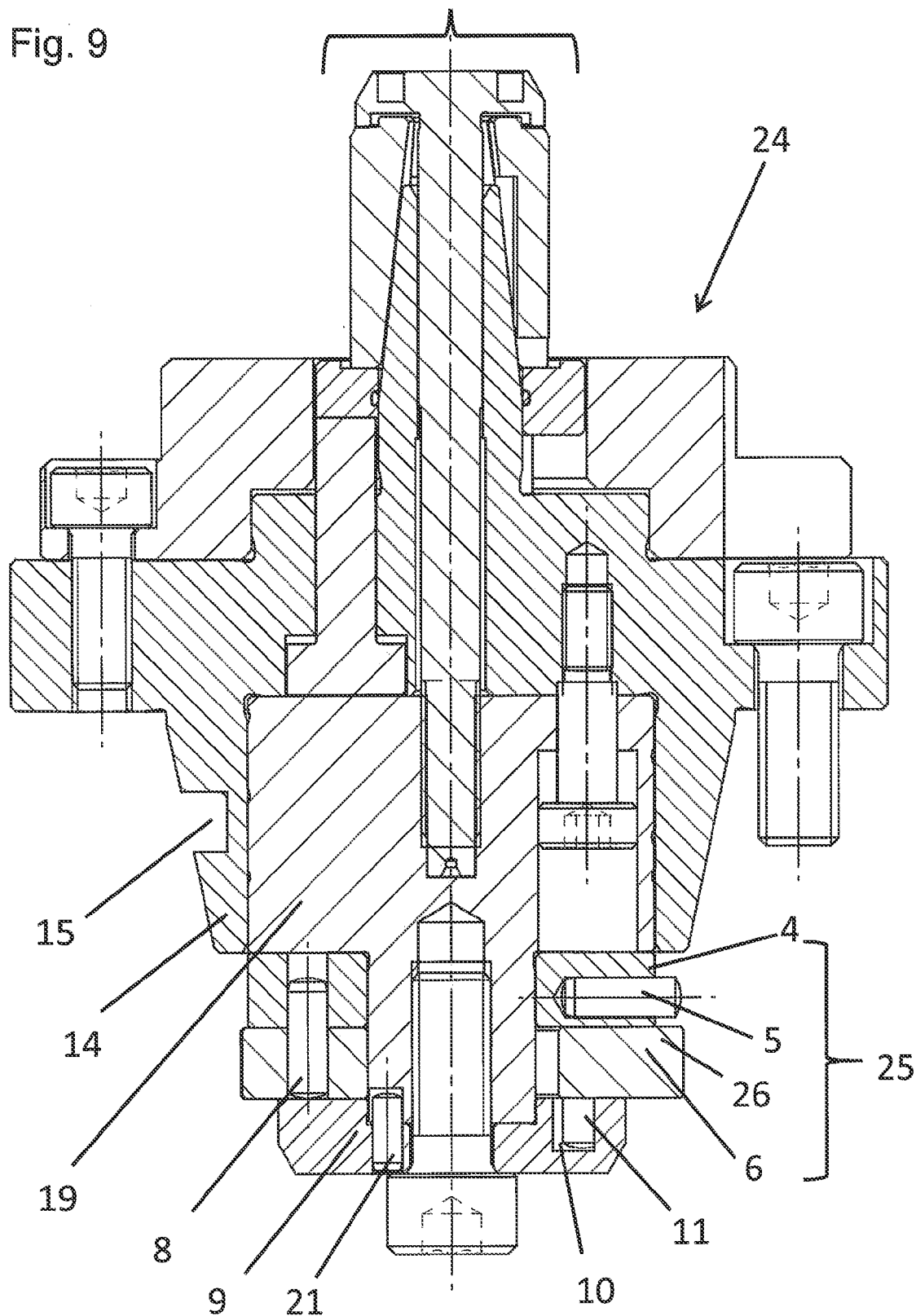
FIG. 9 is a longitudinal cross-section of the isolated clamp according to the invention with locking unit.
Figure 10:
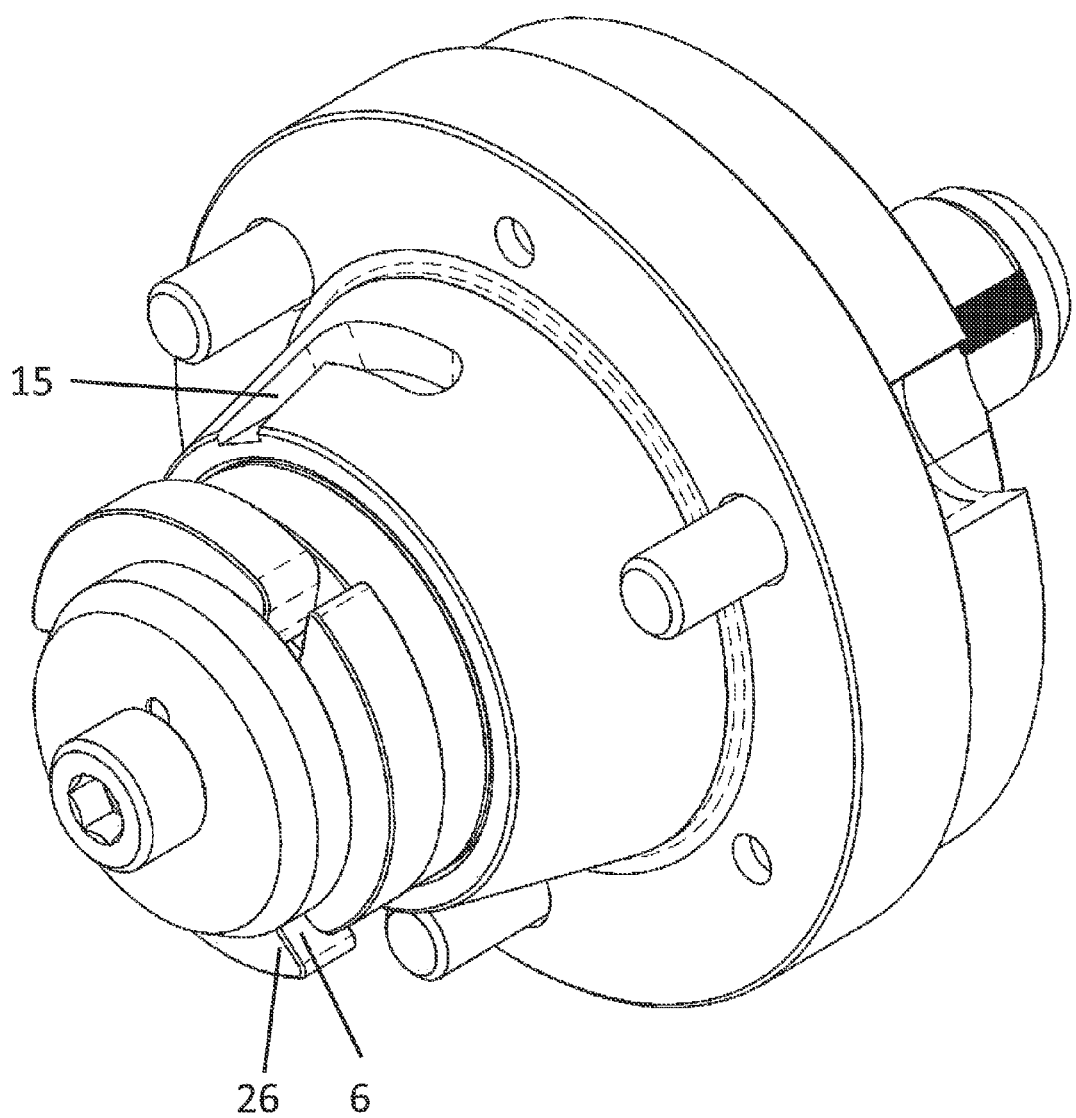
FIG. 10 is a perspective view of the clamp according to the invention with latches moved outward.

FIG. 9 shows a clamp 24, in this case a mandrel, which can be secured to a chuck 23 and serves to chuck a tool. The clamp 24 has a conically shaped clamp body 14, a chucking element 20, in this case a mandrel, and a locking unit 25. Formed in the clamp body is a guide slot 15 that extends axially parallel to the longitudinal axis of the clamp 24 in a translation region 15.1, and is adjoined at right angles by a rotation region 15.2. The locking unit 25 is carried by a pivot body 19 and having a cover 9, a segment 6, and a rotary disk 4. A blocking element 5 in the form of a peg projects laterally from the rotary disk. The rotary disk 4 is connected to the segment 6 by a bearing element 8. In the exemplary embodiment shown, as depicted in FIG. 10, the segment 6 is composed of three latches 26 that can pivot outward. As is evident from FIG. 5, the latches 26 are rounded at one end and have a latch receptacle at the other end that is rounded in a manner matched thereto for a space-saving arrangement. FIG. 9 also shows that a bearing element 8 and a guide 11 is associated with each of the latches 26. The three guides 11 are each located in suitable guide slots 10 of the cover 9 and can be moved therein. Furthermore, the cover 9 is connected by a connecting member 21 to the pivot body 19, which serves the purpose of correct alignment of the cover 9 and thereby of the guide slots 10. As is evident from FIG. 7, the pivot body 19 has an elastic thrust piece 16 in a thrust piece receptacle 17 located in a recess 18 of the rotary disk 4.

Figure 1:
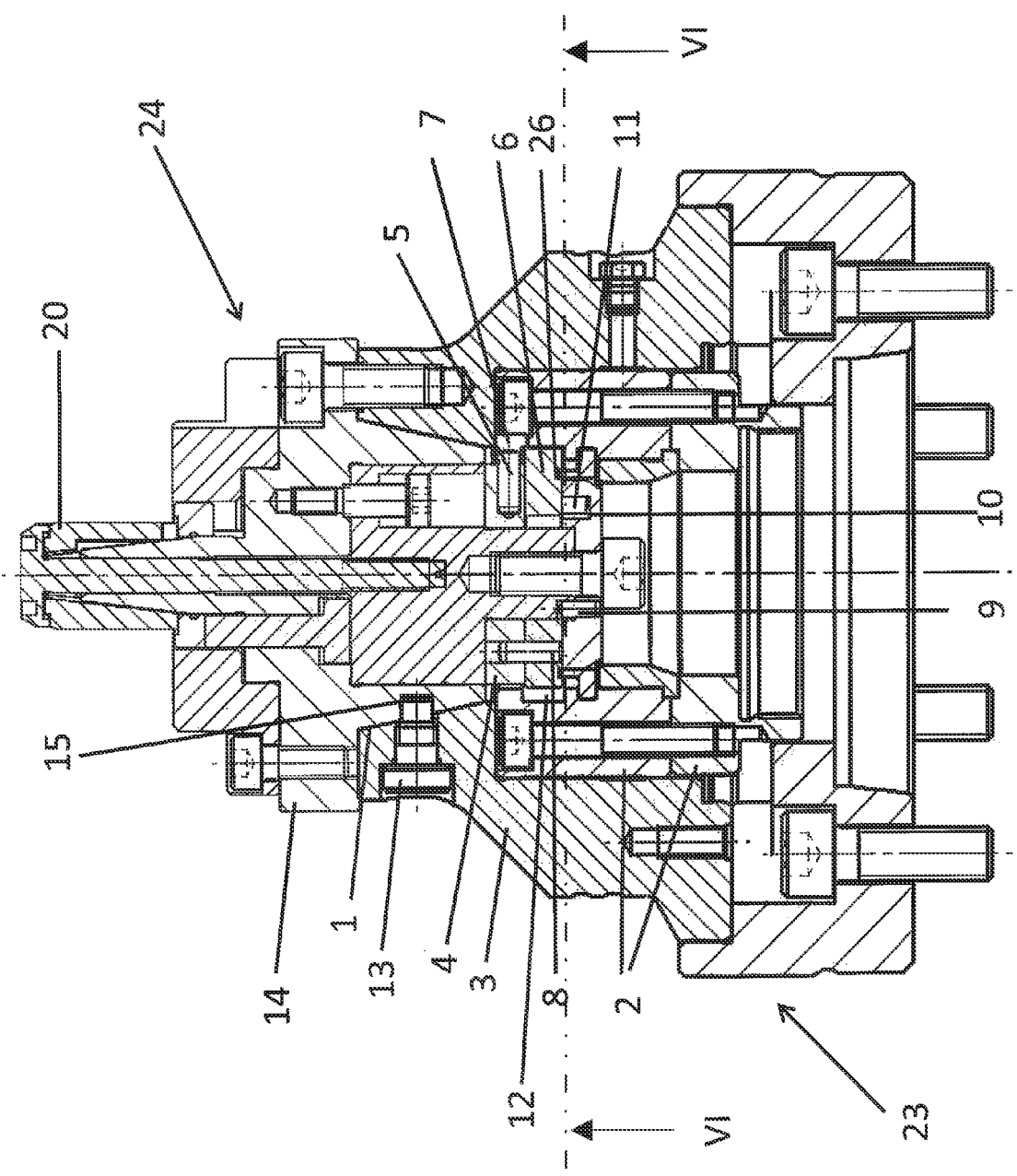
FIG. 1 is a longitudinal section through the chuck according to the invention and through the clamp in the locked position.

FIG. 1 shows the chuck 23 with a chuck body 3 and a guide opening 1 into which the above-described clamp 24 shown in isolation in FIG. 9 is inserted and secured. The clamp 24 can be moved in the chuck body 3 by the actuating element 2, which is made in multiple parts for manufacturing reasons, via a drawbar. The actuating element 2 has an annular groove 12 and a blocking element receptacle 7 that is open toward the top. Moreover, the chuck 23 has securing mechanism 13 in the form of a screw that projects through a threaded bore.

Figure 7:
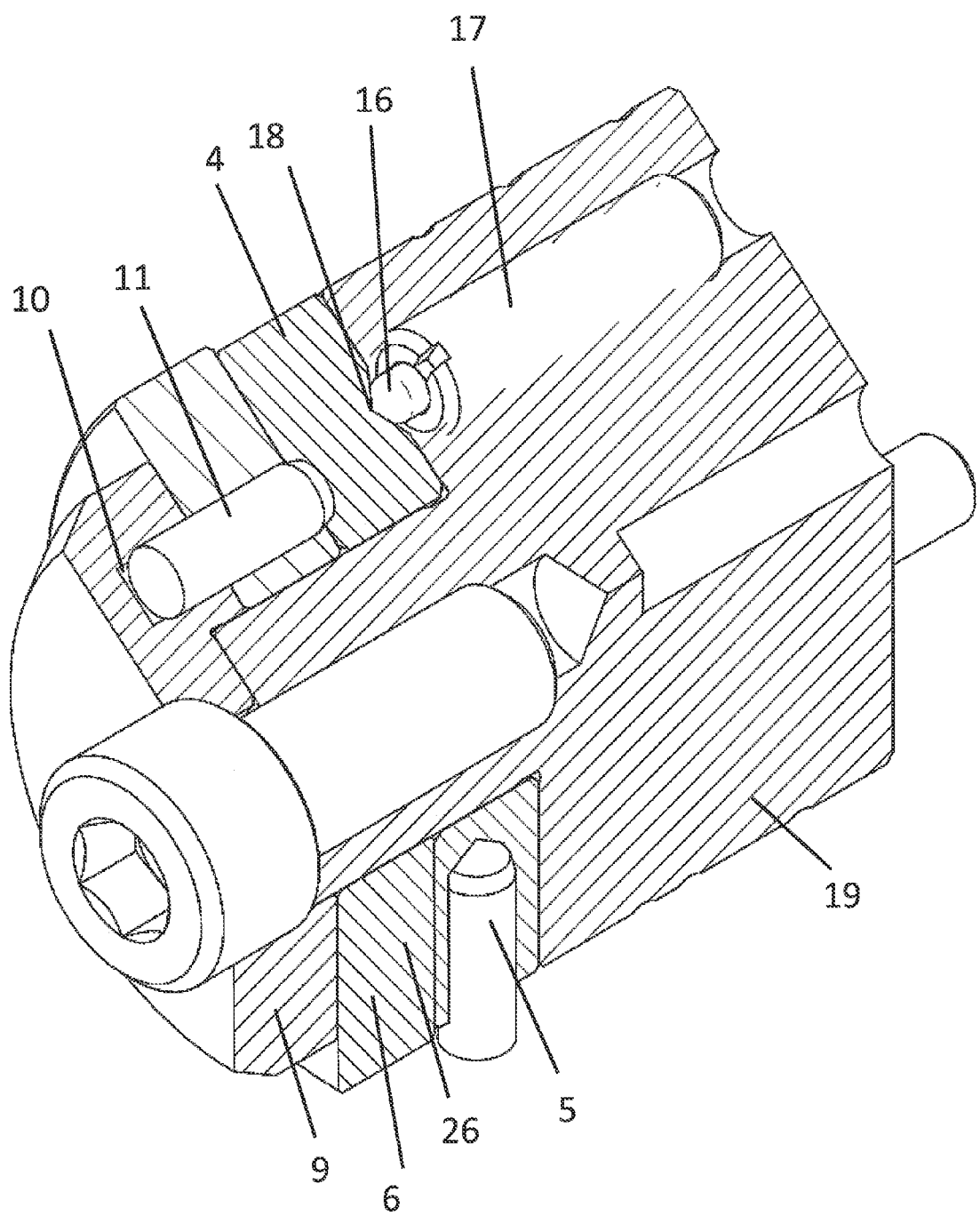
FIG. 7 is a perspective, partially sectional view of the locking unit of the clamp with the thrust piece.

The clamp 24 is properly aligned prior to assembly. To this end, the locking unit 25, including the cover 9, segment 6, and rotary disk 5, is rotated against the pivot body 19 of the clamp 24 until the thrust piece 16 slides into the recess 18 of the rotary disk. This defines the angular alignment of the blocking element 5 relative to the clamp 24 (FIG. 7).

Figure 3:
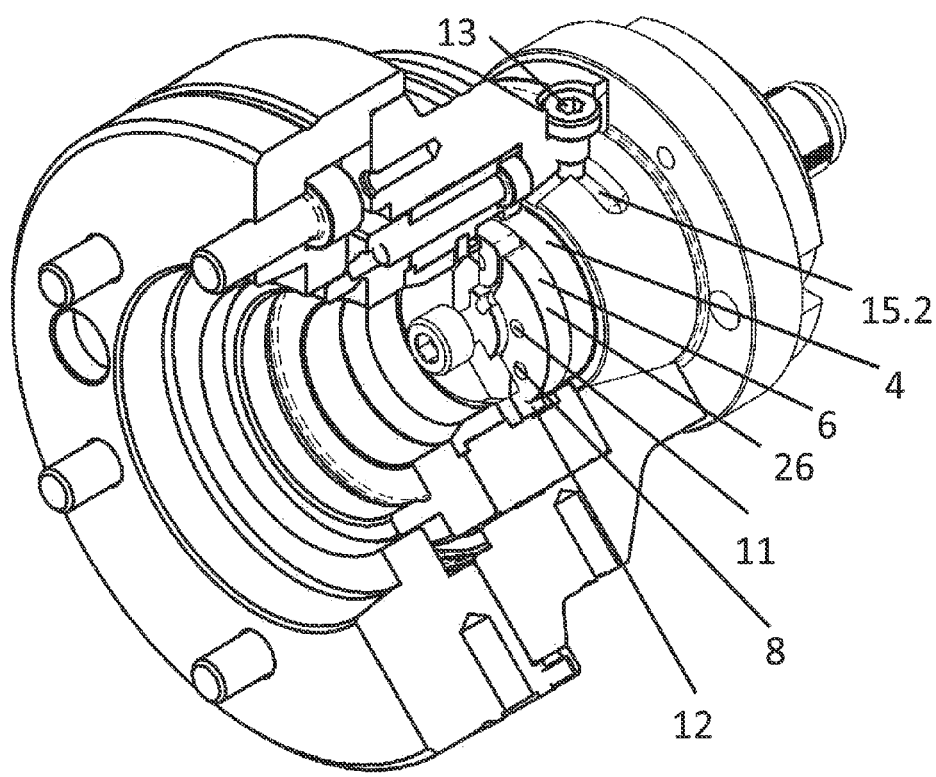
FIG. 3 is a perspective, partially sectional view corresponding to FIG. 2 of the chuck and of the clamp in the unlocked position.

FIG. 3 illustrates the role of the securing mechanism 13 of the chuck 23 and the guide slot 15 of the clamp 24 during insertion of the clamp 24 into the chuck 23 through a translational motion. The insertion of the securing mechanism 13 into the translation region 15.1 of the guide slot 15 of the clamp 24 ensures simple alignment of the clamp 24 with the chuck 23. Once the securing mechanism 13 has reached the end of the translation region 15.1, which is to say that the clamp 24 is inserted, the blocking element 5 slides into the blocking element receptacle 7 of the chuck 23, as is evident in FIG. 1.

Figure 4:
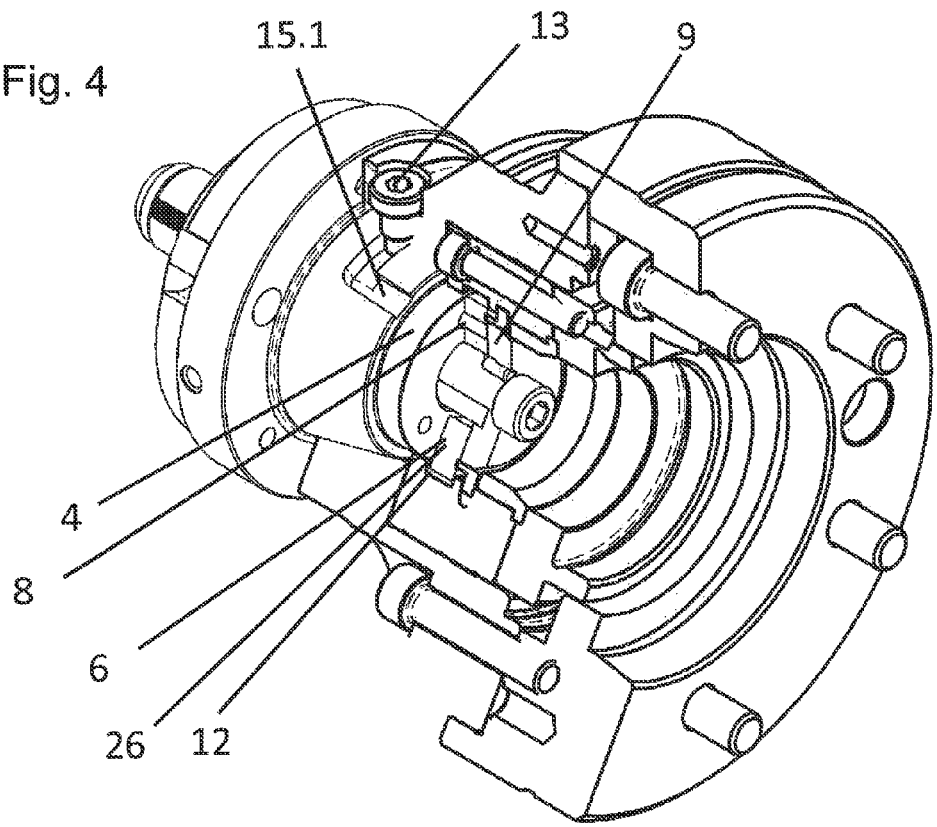
FIG. 4 is a perspective, partially sectional view corresponding to FIG. 1 of the chuck and of the clamp in the locked position.

To secure the clamp 24 in the chuck 23, the clamp 24 is rotated, as a result of which the securing mechanism 13 is located in the rotation region 15.2 of the guide slot 15, as shown in FIG. 4. FIG. 1 shows that during the rotational motion of the clamp 24, the latches 26 are pushed outward into the groove 12 of the chuck 23, via which securing of the clamp 24 is achieved through positive locking. A relative motion should be achieved within the locking unit 25 so that the latches 26 can be pushed outward. This is made possible in that the blocking element 5 in the blocking element receptacle 7 secures the rotary disk 4 against rotation when the clamp 24 is rotated. The relative motion is additionally made possible by the fact that each of the latches 26 is connected through a bearing element 8 to the rotary disk 4. During rotation of the clamp 24, the rotary disk is thus held in place in the blocking element receptacle 7 because of the blocking element 5, while the latches 26 are pushed outward during a motion relative to the rotary disk 4 because of the coupling by the bearing elements 8. In this process, the axis of rotation 4 of the latches 26 is defined by the bearing elements 8. At the same time, the outward motion of the latches 26 is achieved in that when the clamp 24 rotates, the guides 11 of the latches 26 are moved within the guide slots 10 of the cover 9.

Figure 2:
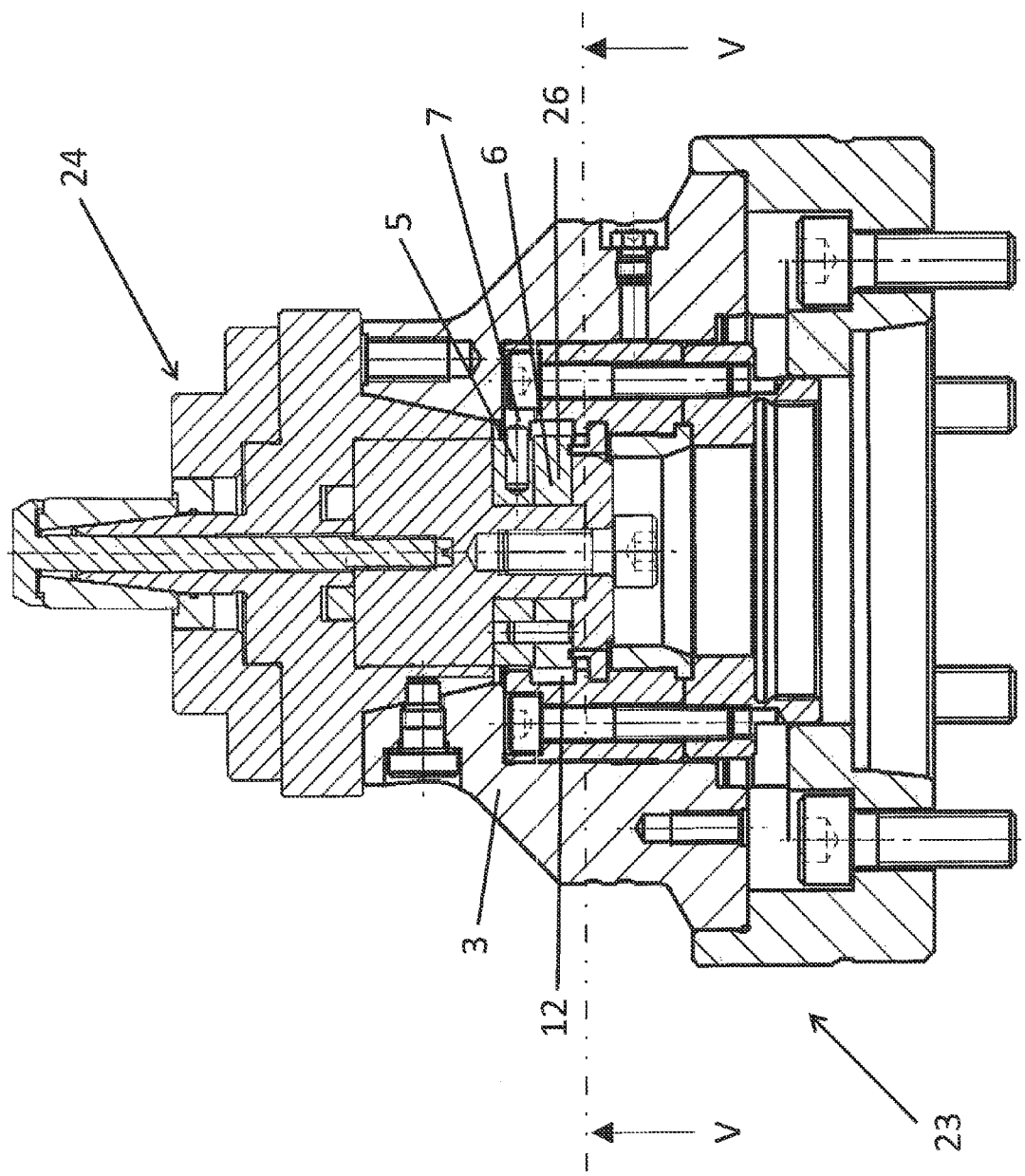
FIG. 2 is a view corresponding to FIG. 1 of the chuck according to the invention in the unlocked position.

To change the clamp 24 or to unlock, the clamp 24 is rotated in the opposite direction, the securing mechanism 13 is moved within the rotation region 15.2 of the guide slot 15, and the guide 11 is pushed into the guide slots 10. As a result, the latches 26 pivot inward as shown in FIG. 2 and are no longer located in the groove 12. Removal of the clamp 24 from the chuck 23 takes place by a translational motion of the clamp 24, wherein the blocking element 5 slides out of the blocking element receptacle 7.

Figure 5:
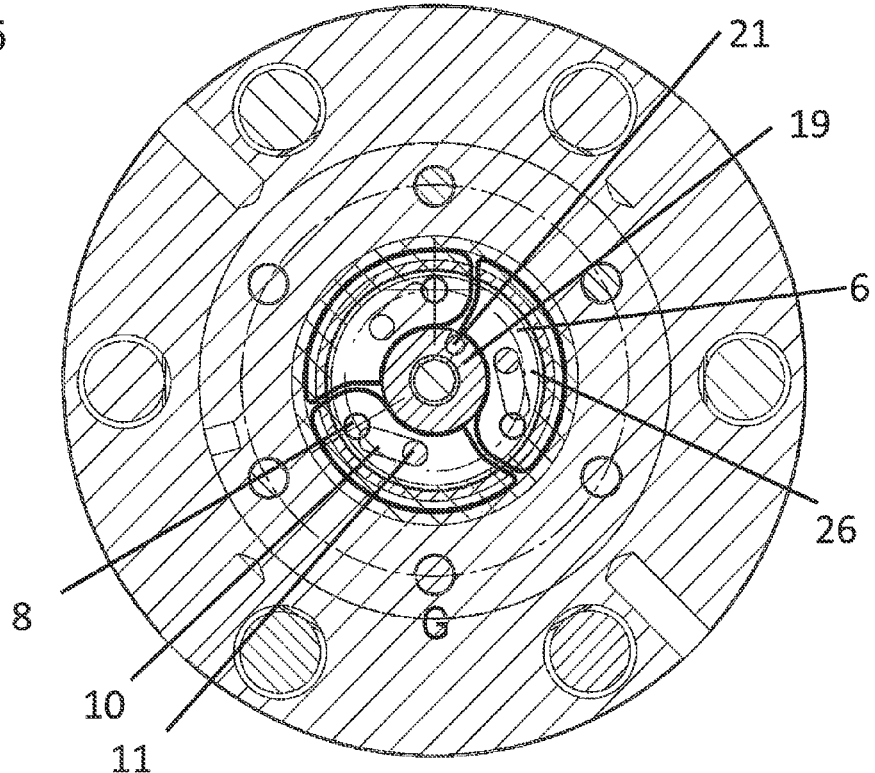
FIG. 5 is the section V-V from FIG. 2.
Figure 6:
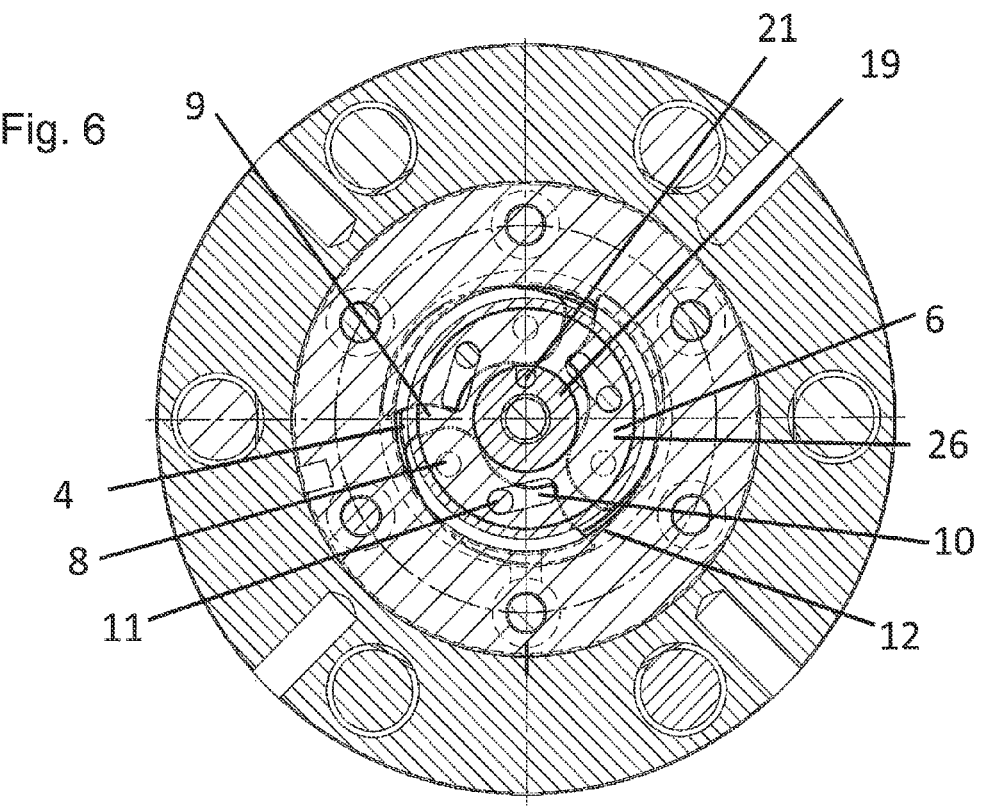
FIG. 6 is the section VII-VII from FIG. 1.

In FIG. 5 and FIG. 6, the cross-sections V-V from FIG. 2. and VI-VI from FIG. 1 of the clamp 24 and of the chuck 23 in the unlocked and locked positions are compared to one another. During rotation of the clamp 24, both the pivot body 19 and the connecting member that couples cover 9 and pivot body 19 are rotated. The rotary disk 4 is held in place by the blocking element 5 during the rotation and the guides 11 are moved within the guide slots 10, as a result of which the three latches 26 are pushed outward into the groove 12 (see FIG. 6). FIG. 5 shows the unlocked position, i.e., the latches 26 are pivoted inward.

FIG. 5 and FIG. 6 also illustrate that each segment 6 has a guide 11 and a bearing element 8. The bearing elements 8 couple the latches 26 to the rotary disk 4, permitting relative rotation within the locking unit 25. At the same time, the axis of rotation is defined by the bearing elements 8.

Figure 8:
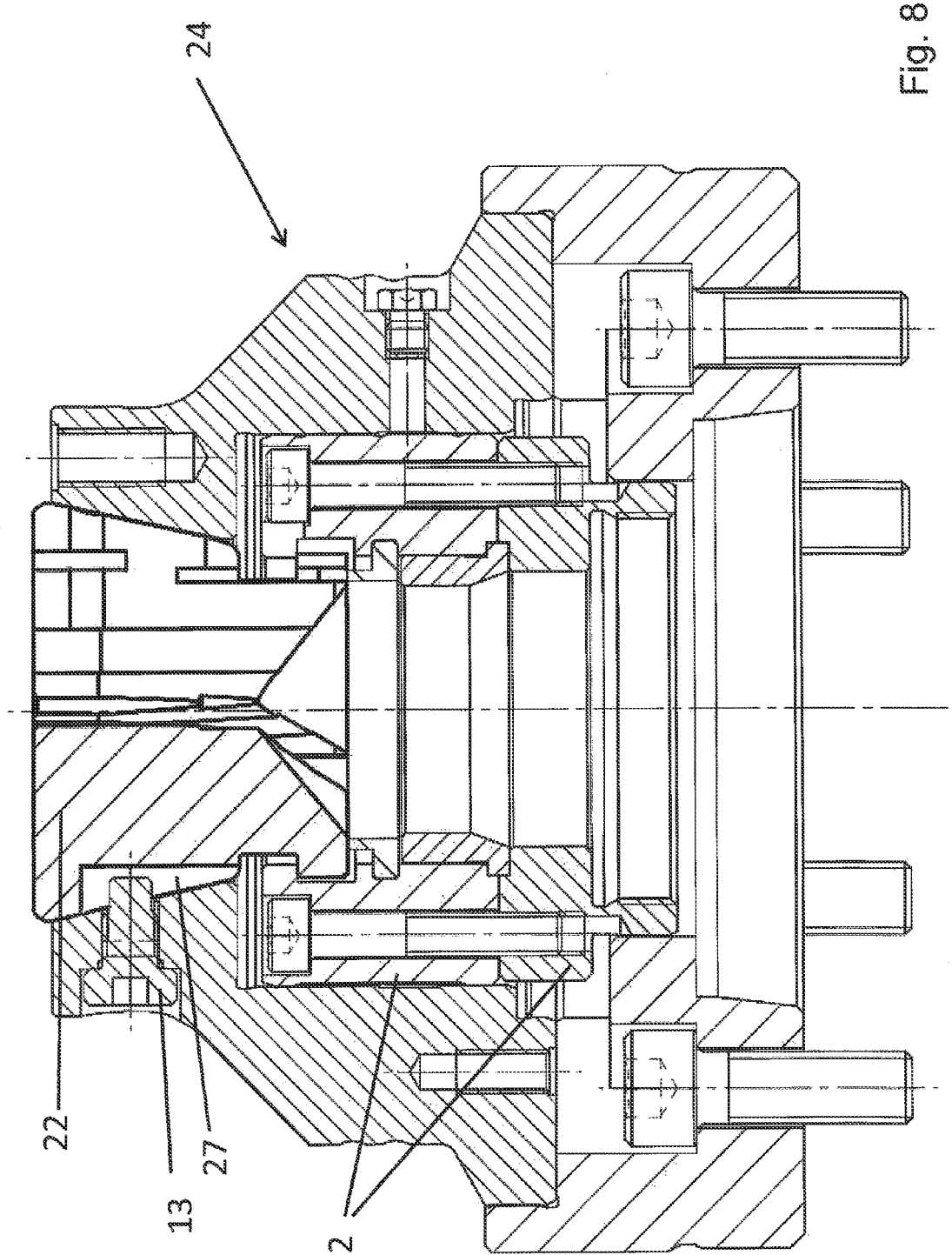
FIG. 8 is a chuck corresponding to FIG. 1 with an alternative clamp.

FIG. 8 illustrates that the chuck 23 according to the invention is also suitable for accommodating a different clamp 24, in this case a clamping jaw 22, without the need to change the chuck. It is further illustrated that the chuck 23 can also function with a different locking system, which is to say without rotation and without wedging latches 26. Once the clamping jaw 22 has been inserted into the chuck 23, the securing mechanism 13 projects into a clamp recess 27. Clamping takes place by pulling on a drawbar, not shown in detail in the drawing, that moves the actuating element 2 that stands in connection with the clamping jaw 22 or the clamp 24.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A chuck comprising:
   a chuck body having a guide opening and an actuating element;
   at least one interchangeable clamp insertable into the guide opening;
   a rotary disk associated with the clamp; and
   a blocking element that secures the rotary disk against rotation relative to the chuck body during insertion of the clamp into the guide opening,
   wherein, upon a rotation of the clamp about the longitudinal axis in the guide opening, a segment is displaced outward toward the chuck body by the rotation relative to the rotary disk for detachable securing of the clamp on the chuck body, and
   wherein the segment and the rotary disk have a bearing element coupling them, wherein the clamp has a cover with a guide slot, and wherein the segment has a guide that is moved in the guide slot during a rotational motion of the clamp.

2. The chuck according to claim 1, wherein the chuck body has a radially formed blocking element receptacle for the blocking element projecting laterally from the rotary disk.

3. The chuck according to claim 1, wherein the segment is a latch in the form of a segment of a reference circle.

4. The chuck according to claim 1, wherein a groove serves to receive the outward-movable segment and is formed in the actuating element.

5. The chuck according to claim 1, wherein the segment is provided in multiple instances that are uniformly distributed over the circumference and are provided with a corresponding number of the guide and bearing elements, wherein the cover has a number of guide slots equivalent to the corresponding number of the guide, and wherein the actuating element has a corresponding number of grooves or one groove extending radially over an inner circumference of the actuating element.

6. The chuck according to claim 1, wherein the chuck body has a securing mechanism, and wherein a clamp body of the clamp has a guide slot that permits translational and rotational motion of the securing mechanism during rotation of the clamp.

7. A chuck comprising:
   a chuck body having a guide opening and an actuating element;
   at least one interchangeable clamp insertable into the guide opening;
   a rotary disk associated with the clamp; and
   a blocking element that secures the rotary disk against rotation relative to the chuck body during insertion of the clamp into the guide opening,
   wherein, upon a rotation of the clamp about the longitudinal axis in the guide opening, a segment is displaced outward toward the chuck body by the rotation relative to the rotary disk for detachable securing of the clamp on the chuck body, and wherein the clamp has an elastic thrust piece in a thrust piece receptacle, which slides into a recess of the rotary disk during rotation of the clamp relative to the rotary disk and serves to align the rotary disk and the blocking element relative to the chuck.

* * * * *